March 9, 1937.                 J. MIHALYI                2,073,314
                          ADJUSTABLE FILTER MOUNT
                            Filed May 14, 1935
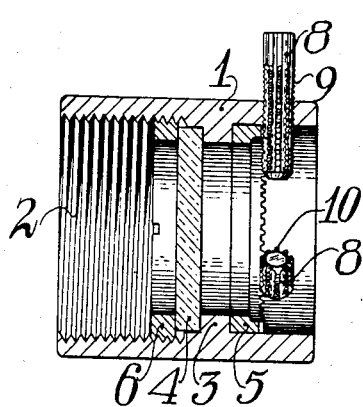
FIG_1_
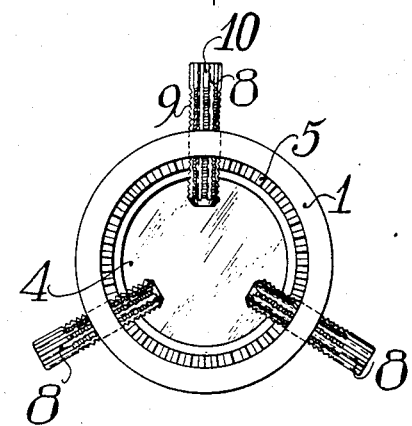
FIG_2_
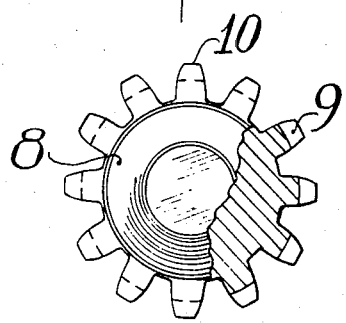
FIG_3_
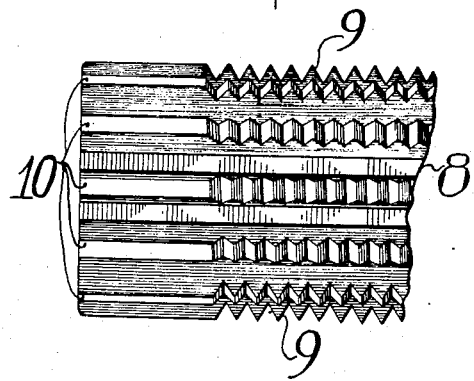
FIG_4_
INVENTOR.
Joseph Mihalyi,
BY Newton N. Perkins
Donald H. Stewart.
ATTORNEYS.

Patented Mar. 9, 1937

2,073,314

UNITED STATES PATENT OFFICE 2,073,314

ADJUSTABLE FILTER MOUNT

Joseph Mihalyi, Rochester, N. Y., assignor, by mesne assignments, to Eastman Kodak Company, Jersey City, N. J., a corporation of New Jersey Application May 14, 1935, Serial No. 21,389

4 Claims. (Cl. 95—81)

This invention relates to photography and more particularly to an adjustable filter mount having a series of locking screws which position and automatically center the filter mount on a lens tube when any one of the several locking means is adjusted.

In order to be real satisfactory, a filter mount must be constructed so that different filters can be interchanged rapidly and accurately, and it must also possess means for clamping and centering itself rapidly and accurately upon a lens tube. Of these two important requisites, the one that is lacking in most filter mounts, that are now on the market, is the suitable means for locking and centering itself rapidly and accurately on a lens tube. It is true, that different methods of locking a filter mount on a lens tube so that it is centered have been devised, but they all require either a trial and error method of adjustment of the several clamping means, or they rely on a specially constructed resilient gripping means which have a tendency to center the filter mount on a lens tube when in engagement therewith.

Therefore, one object of my invention is to provide an adjustable filter mount in which filters of different colors can be interchanged rapidly and accurately. Another object is to provide an adjustable filter mount in which the several locking screws are suitably inter-connected so that an adjustment of one will be equally transmitted to the others so that the filter mount will be automatically centered on a lens tube. And still another object is to provide an adjustable filter mount whose clamping means adapt it to engage lens tubes of various sizes.

Briefly, my invention consists of a main filter mount in which a filter is positioned by an internal flange and a screw threaded retaining ring. A crown geared ring is rotatably mounted within the mount on the opposite side of the above mentioned internal flange and is confined by three locking screws which enter the periphery of the main filter radially. These locking screws are made from standard pinion rod stock and mesh with the crown geared ring. A portion of the periphery of each locking screw is threaded to engage tapped holes in the wall of the main filter mount. Therefore, due to the screw threaded engagement between the locking screws and the tapped holes in the wall of the filter mount in combination with the meshing of the teeth on the locking screws and the teeth of the crowned geared ring, all three of the locking screws are propelled into or repelled from the interior of the filter mount by the adjustment of any one of the locking screws, thereby gripping and automatically centering the filter mount on a lens tube.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which, Fig. 1 is a longitudinal section of the filter mount showing the filter in position and the meshing of the locking screws and the crown gear.

Fig. 2 is a rear elevation of the filter mount showing the relative position of the locking screws.

Fig. 3 is an enlarged end view of one of the locking screws, partly in section and partly in elevation, showing the engaging end of the screw and the relation of its gear teeth to the screw threads thereon, and Fig. 4 is a side elevation of a portion of a locking screw showing the end which extends outside of the filter mount for adjustment purposes, and enlarged to show the relation between the screw threads and the gear teeth thereon.

Like references refer to corresponding parts in the several views.

As shown in Fig. 1, the adjustable filter mount consists of a main filter mount 1 which is internally threaded on its forward end as shown at 2. This main filter mount is provided with an internal collar 3 which acts as a stop for locating the filter 4 and the crown geared ring 5. The filter 4 is locked in position within the main filter mount 1 by a threaded retaining ring 6 which is screwed into the forward end of the filter mount 1. This locking arrangement for the filter 4 makes possible the rapid interchange of filters by merely unscrewing the retaining ring 6, inserting the desired filter, and tightening it down again until the filter is positioned tightly against the internal collar 3.

A crown geared ring 5 is rotatably confined within the main filter mount 1 against the other side of the internal collar 3 by three locking screws 8. These three locking screws 8 are made from standard pinion rod stock and mesh with the teeth on the crown geared ring 5. The locking screws 8 are threaded, as shown best by 9 in Figs. 3 and 4, and are screwed into tapped holes which are located around the periphery of the main filter mount 1. The threads 9 on the locking screws 8 are cut to a depth which allows the locking screws to be screwed radially into and out of the main filter mount 1, but whose depth is substantially less than the depth of the gear teeth on the periphery of the locking screws so that enough effective face is left on the gear teeth 10 to allow them to properly mesh with the gear teeth on the crown geared ring 5 and give the desired driving connection between the two.

Now looking at Fig. 1 and Fig. 2, it can be seen that if the locking screws 8 are threaded into the main filter mount 1 equally until the gear teeth 10 on their periphery engage the gear teeth on the crown geared ring 5, any turning adjustment that is given to one of the locking screws will be transmitted equally to all of the other locking screws through the medium of the rotatable crown geared ring 5; and all of the locking screws 8 will be propelled or repelled into or out of the main filter mount equal distances. This concerted movement of all of the locking screws 8, under the adjustment of any one of them, insures the absolute centering of the main filter mount with relation to the lens tube on which it is mounted.

The operation of this device is very simple and accurate. First the desired filter 4 is inserted into the forward end of the main filter mount 1, and it is held against the collar 3 by the retaining ring 6. Then any one of the locking screws 8 is turned so that it is repelled from the main filter mount. This adjustment is transmitted equally to all of the other locking screws simultaneously and is continued until the mount will slip over the lens tube which is to be engaged. After slipping the filter mount over the lens tube, it is locked in position and automatically centered by tightening any one of the locking screws 8, because the adjustment of the one locking screw is equally and similarly transmitted to each and every one of the locking screws simultaneously.

In the drawing I have shown the locking means for the filter mount consisting of three locking screws arranged at 120° to each other around the periphery of the filter mount, because said distribution provides a suitable centering and gripping arrangement with the least number of locking screws. It is obvious that the number and distribution of the locking screws could be increased and altered respectively and still work on the same principle without deviating from the scope of my invention.

I have described, as a preferred embodiment of my invention, my mount as a filter mount since it is primarily intended for this purpose. It is to be understood, however, that when I refer to "filter" in the specification and claims I wish it to be understood to include not only filter attachments for objectives, but also screens, such as diffusion screens; lenses, such as copying, telephoto and lens adapted to change the magnification of the image, polarizing material, and/or any other supplementary element adapted to be used in conjunction with an objective.

Although I have shown and described certain specific embodiments of my invention, I am fully aware that many modifications thereof are possible. My invention, therefore, is not to be restricted except in so far as is necessitated by the prior act and by the spirit of the appended claims.

Having thus described my invention, what I declare is new and desire to secure by Letters Patent of the United States is:

1. An adjustable filter mount comprising a main filter mount having an internal positioning collar, a filter on one side of said collar within the filter mount, a retaining ring for said filter screw threaded internally of said filter mount, a crown geared ring within the mount and positioned on the opposite side of said collar, and clamping screws through the periphery of the filter mount meshing with and confining said crown geared ring within the mount, each of said clamping screws adapted to be equally propelled into or repelled out of said mount by the actuation of any one of said screws for clamping the mount on a lens tube.

2. An adjustable filter mount comprising a main filter mount having a filter held in said mount by a retaining ring, a crown geared ring rotatably mounted within said mount, and clamping screws through the periphery of the mount adapted to engage and clamp said mount to a lens tube and meshing with said crown geared ring so that an equal propulsion or repulsion of all of said clamping screws into or out of said mount is effected by the actuation of any one of the same.

3. An adjustable filter holder comprising a main filter mount, means for retaining a filter within said mount, a crown geared ring rotatably mounted in said mount and a plurality of clamping screws adapted to be propelled into or repelled from said mount for centering and fixing said filter holder on a lens tube, said clamping means meshing with said crown geared ring to provide an equal and simultaneous adjustment of all of said clamping means when one is adjusted.

4. An adjustable filter holder comprising a main filter mount, suitable means for positioning a filter within said mount, clamping screws through the periphery of said mount for positioning and centering said filter holder on a lens tube, and a crown geared ring rotatably mounted within said mount and meshing with said clamping screws whereby an equal adjustment of all clamping screws into or out of the mount is effected through the adjustment of any one of said clamping screws.

JOSEPH MIHALYI.